US011926009B2

(12) United States Patent
Magno

(10) Patent No.: US 11,926,009 B2
(45) Date of Patent: Mar. 12, 2024

(54) APPARATUS FOR RESTORING THE SHAPE OF A BEVERAGE PREPARATION CAPSULE

(71) Applicant: EVOCA S.P.A., Milan (IT)

(72) Inventor: Alessandro Magno, Milan (IT)

(73) Assignee: EVOCA S.P.A., Milan (IT)

(*) Notice: Subject to any disclaimer, the term of this patent is extended or adjusted under 35 U.S.C. 154(b) by 512 days.

(21) Appl. No.: 17/289,370

(22) PCT Filed: Oct. 30, 2019

(86) PCT No.: PCT/IB2019/059305
§ 371 (c)(1),
(2) Date: Apr. 28, 2021

(87) PCT Pub. No.: WO2020/089808
PCT Pub. Date: May 7, 2020

(65) Prior Publication Data
US 2022/0001499 A1 Jan. 6, 2022

(30) Foreign Application Priority Data

Oct. 30, 2018 (EP) .................................. 18203527
Apr. 19, 2019 (IT) ...................... 102019000006152

(51) Int. Cl.
*A47J 31/44* (2006.01)
*B23P 6/00* (2006.01)

(52) U.S. Cl.
CPC ................. *B23P 6/00* (2013.01); *A47J 31/44* (2013.01)

(58) Field of Classification Search
CPC .................................... A47J 31/44; B23P 6/00
See application file for complete search history.

(56) References Cited

U.S. PATENT DOCUMENTS

2009/0293736 A1   12/2009   Jarisch

FOREIGN PATENT DOCUMENTS

| WO | 2008142663 A2 | 11/2008 |
| WO | 2012046195 A1 | 4/2012 |

OTHER PUBLICATIONS

International Search Report and Written Opinion from International Application No. PCT/IB2019/059305 dated May 12, 2020.

*Primary Examiner* — James Sanders
(74) *Attorney, Agent, or Firm* — Dorsey & Whitney LLP

(57) ABSTRACT

An apparatus for restoring a deformed portion of a beverage preparation capsule to a shape that approximates its original shape. The apparatus comprises a seat configured to accommodate the capsule, a bending device configured to engage the deformed portion of the capsule, and a drive device to relatively move the bending device and at least part of the seat to cause the bending device to restore the deformed portion of the capsule to a shape that at least approximates its original shape.

11 Claims, 12 Drawing Sheets

APPARATUS FOR RESTORING THE SHAPE OF A BEVERAGE PREPARATION CAPSULE

CROSS-REFERENCE TO RELATED APPLICATIONS

This patent application is a U.S. National Stage of PCT International Application No. PCT/IB2019/059305 filed on Oct. 30, 2019, which claims priority to European patent application No. 18203527.9 filed on Oct. 30, 2018 and to Italian patent application No. 102019000006152 filed on Apr. 19, 2019, the entire disclosures of which is incorporated herein by reference.

TECHNICAL FIELD

The present invention concerns an apparatus for restoring a deformed portion of a beverage preparation capsule to a shape that approximates an original shape.

BACKGROUND ART

The present invention finds advantageous application to beverage preparation capsules, also known as pods, of the type comprising two sheets, preferably of heat-sealable material, connected together along their perimetric edges to define a chamber containing a beverage preparation product, and an essentially flat annular flange extending around the chamber, to which capsule the following discussion will refer without this implying any loss of generality.

In the field of beverage preparation, beverage preparation machines are well known comprising at least one storage unit to store beverage preparation capsules; at least one brewing assembly including a brewing chamber designed to accommodate a capsule, a hydraulic circuit to supply pressurised hot water through the capsule; and a transfer device to transfer individual capsules from the storage unit to the brewing chamber.

The beverages preparation machines of the type described above have some drawbacks mainly due to the fact that the annular flange of the capsule is relatively thin and can be deformed both in the storage unit and during its transfer from the storage unit to the brewing assembly.

Therefore, when a capsule is supplied to the brewing chamber with a deformed annular flange, the fluid-tight coupling of the brewing chamber with the capsule and, resultingly, the supply of pressurised hot water through the brewing chamber and the capsule may be compromised.

OBJECT AND SUMMARY OF THE INVENTION

The purpose of the present invention is to provide a simple and inexpensive apparatus for restoring a deformed portion of a beverage preparation capsule to a shape that approximates an original shape, so as to solve the drawback described above.

According to the present invention, an apparatus is provided for restoring a deformed portion of a beverage preparation capsule to a shape that approximates an original shape, as claimed in the attached claims.

BRIEF DESCRIPTION OF THE DRAWINGS

The present invention will now be described with reference to the attached drawings, that show two non-limiting embodiments thereof, wherein.

PREFERRED EMBODIMENT OF THE INVENTION

Figure 1:
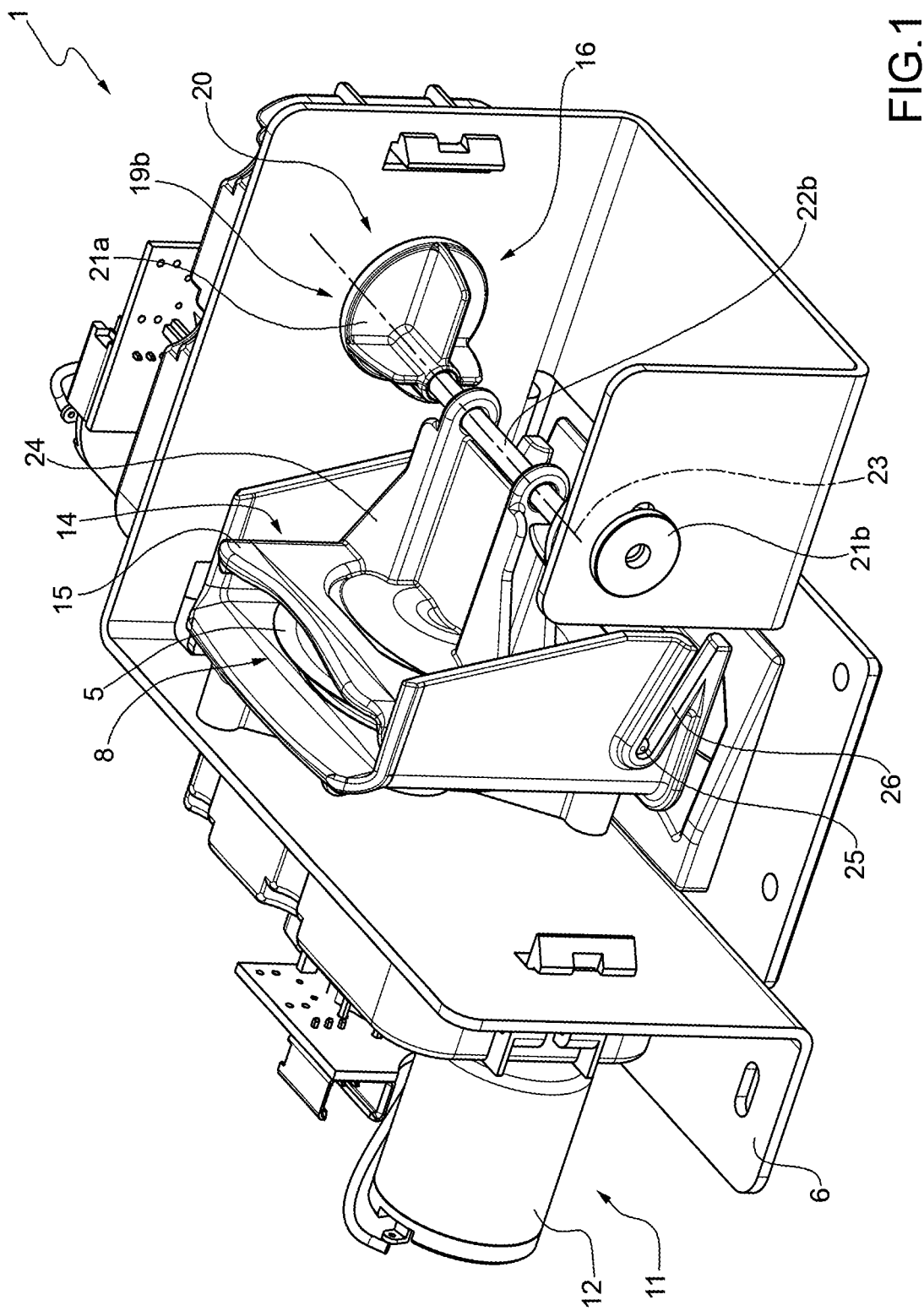
FIG. 1 is a schematic perspective view, with parts removed for clarity, of a first embodiment of the restoring apparatus according to the present invention.
Figure 2:
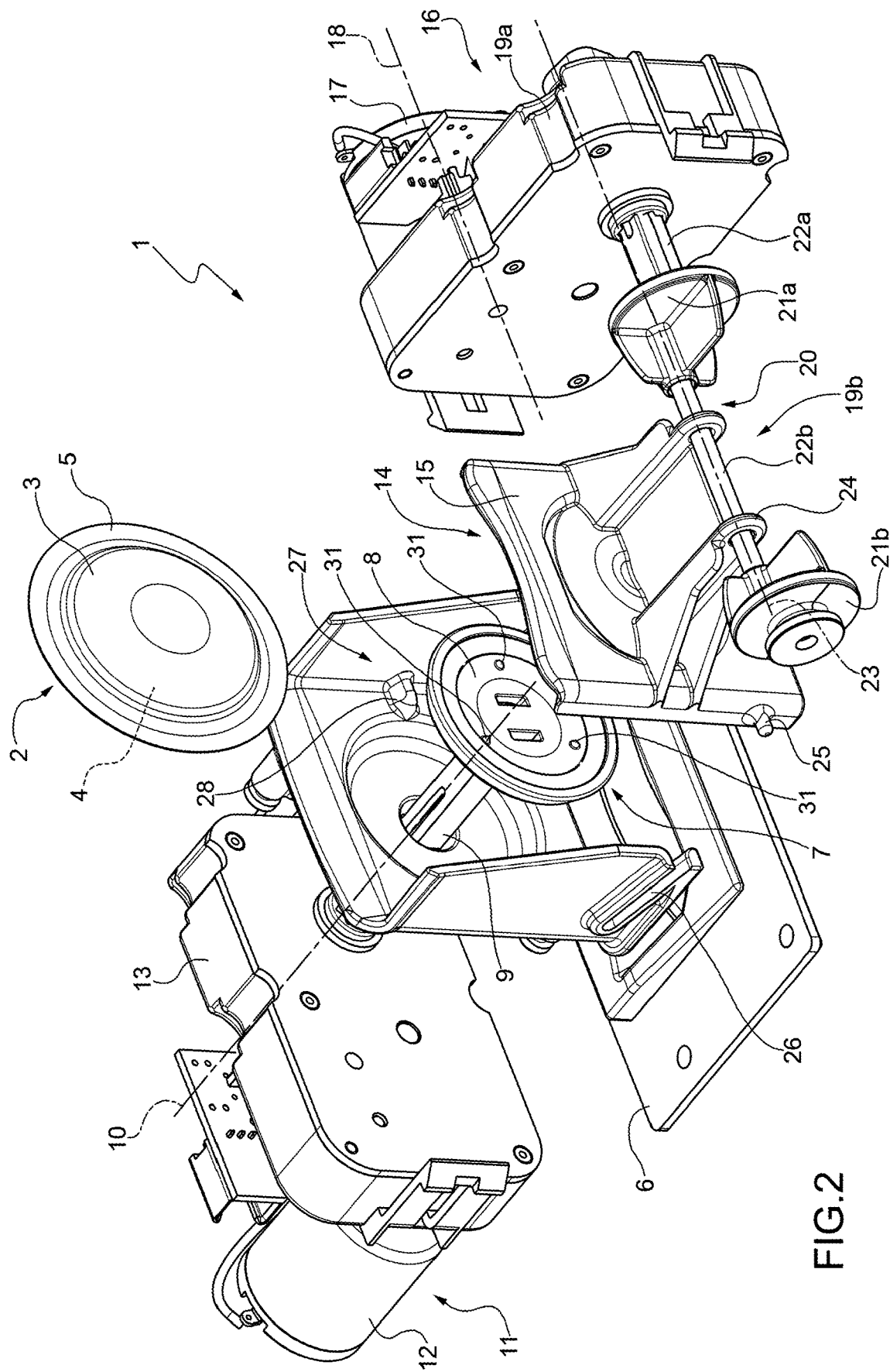
FIGS. 2 and 3 are two schematic, exploded perspective views, with parts removed for clarity, of the restoring apparatus in FIG. 1.
Figure 3:
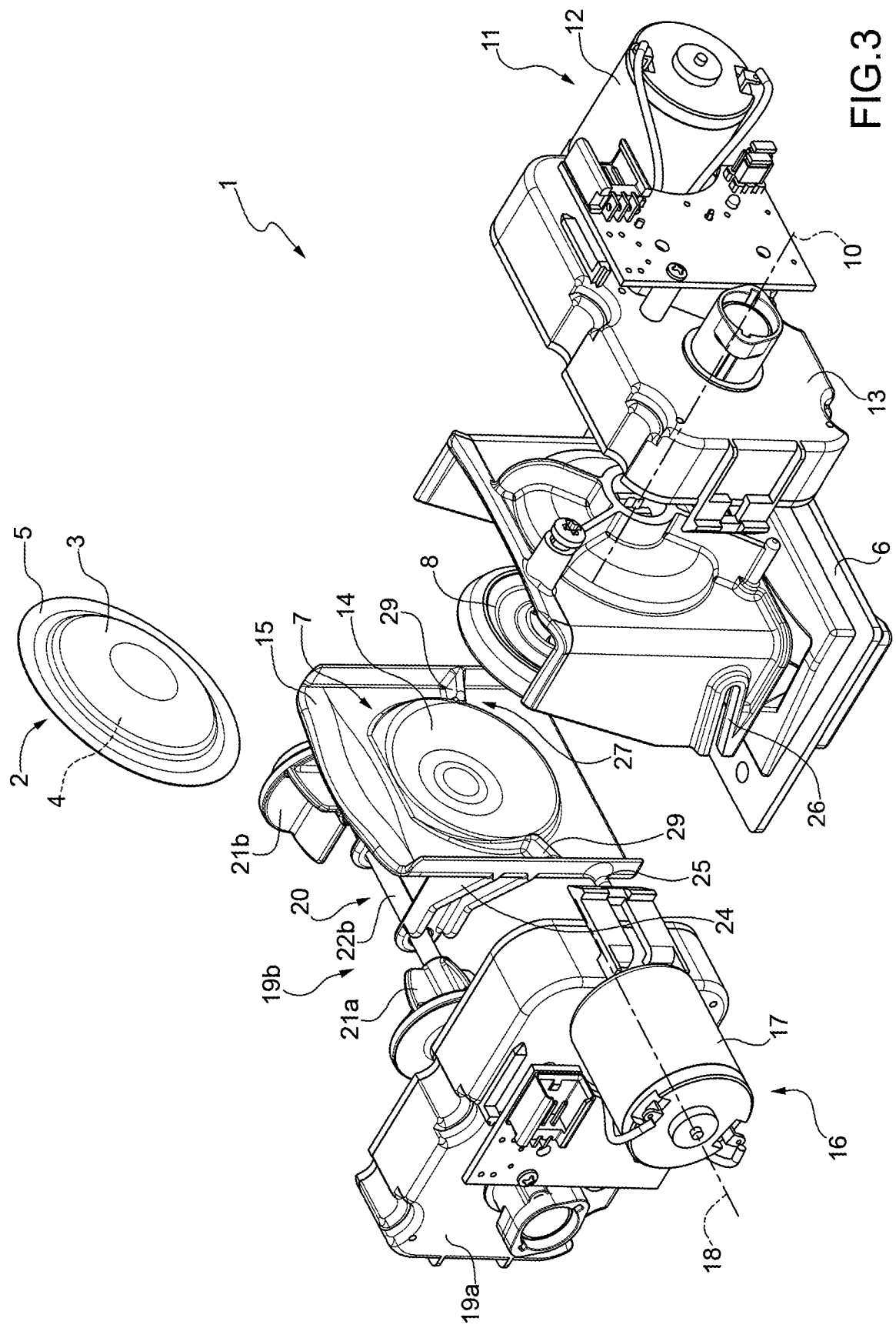

With reference to FIGS. 1, 2, and 3, reference numeral 1 indicates, as a whole, an apparatus for restoring to a deformed portion of a beverage preparation capsule 2 a shape that approximates an original shape.

The apparatus 1 is mounted between a storage unit (not shown) for a plurality of capsules 2 and a brewing assembly (not shown) comprising a brewing chamber, which is designed to accommodate a capsule 2, and a hydraulic circuit to supply pressurised hot water through the capsule 2 in the brewing chamber.

The capsule 2 comprises two sheets 3, preferably made of heat-sealable material, connected together along their respective perimetric edges so as to define a convex central body, which defines, inside, a chamber 4 containing a certain quantity of a product for preparing a beverage, and an essentially flat annular flange 5, which extends around the chamber 4, and may have, in a deformed configuration, a different shape from its original, essentially flat shape.

The flange 5 is relatively thin, so it can be deformed both in the storage unit and during its transfer from the storage unit to the brewing assembly.

According to alternative embodiments not shown, the capsule 2 may have different shapes from that shown in the attached figures and the deformed portion may not necessarily be defined by the flange 5 of the capsule 2.

The apparatus 1 comprises a shaped frame 6 and a seat 7 configured to enclose a capsule 2 inside.

The seat 7 comprises a first portion or first enclosure plate 8, which has a concave cup shape generally complementary to the shape of half of the chamber 4 of the capsule 2, and is fixed to a free end of a transmission shaft 9 mounted through the frame 6 to rotate about a rotation axis 10 substantially horizontal.

The plate 8 is rotated about the axis 10 by a drive device 11 comprising an electric motor 12 fixed to the frame 6 and a gear transmission 13 (FIGS. 4-6) arranged between an output shaft (not shown) of the motor 12 and the shaft 9.

The seat 7 also comprises a second enclosure portion or plate 14, which has a concave cup shape generally complementary to the shape of half of the chamber 4 of the capsule 2, and defines the central portion of a bracket 15 facing the plate 8.

The bracket 15 and, therefore, the plate 14 are moveable, under the thrust of a drive device 16, between a clamping position (FIG. 5), in which the plates 8 and 14 block the capsule 2 inside the seat 7, a loading position (FIG. 4), in which the plates 8 and 14 diverge upwards to allow a capsule 2 to entry the seat 7, and an unloading position (FIG. 6), in which the plates 8 and 14 diverge downwards to allow the capsule 2 to exit from the seat 7.

When the plates 8 and 14 are arranged in their clamping position, the chamber 4 is arranged inside the seat 7 and the flange 5 protrudes outside and all around the seat 7.

The device 16 comprises an electric motor 17, which is fixed to the frame 6, and has an output shaft (not shown), which is rotatably mounted about a rotation axis 18 that is transverse to the axis 10, and is connected to the bracket 15 by a gear transmission 19a and a connecting rod-crank mechanism 19b.

The mechanism 19b comprises a crank 20 comprising, conveniently, two rotating discs 21, one (hereinafter referred to as 21a) of which is fitted on a transmission shaft 22a of the transmission 19a and the other one (hereinafter referred to as 21b) is rotatably coupled to the frame 6. The rotating discs 21 are connected by a transmission shaft 22b having a longitudinal axis 23 eccentric with respect to the axis 18.

The mechanism 19 also comprises a connecting rod 24, which protrudes from the bracket 15, on the opposite side with respect that the one facing the plate 8, and is rotatably coupled to the shaft 22.

The position of the bracket 15 and, therefore, of the plate 14 around the axis 23 is selectively controlled by a pair of coupling pins 25 (FIG. 2), which protrude sideways from opposite sides of the bracket 15, and are slidingly engage respective guide channels 26 formed in the frame 6.

The apparatus 1 further comprises a bending device 27 comprising, in turn, a pair of bending members 28 formed in the frame 6 on opposite sides of the plate 8 and a pair of bending members 29, which are formed in the bracket 15 on opposite sides of the plate 14, and are moveable, under the thrust of the device 16, between an operating position (FIG. 5), in which the members 28 and 29 cooperate therebetween to define a bending or rectifying gap or passage 30 designed to be slidably engaged by the flange 5, and a rest position (FIGS. 4 and 6), in which the passage 30 is not engaged by the flange 5.

In a different embodiment, more than two bending members 28 in the plate 8 and correspondent bending members 29 in the plate 14 may be provided.

Figure 4:
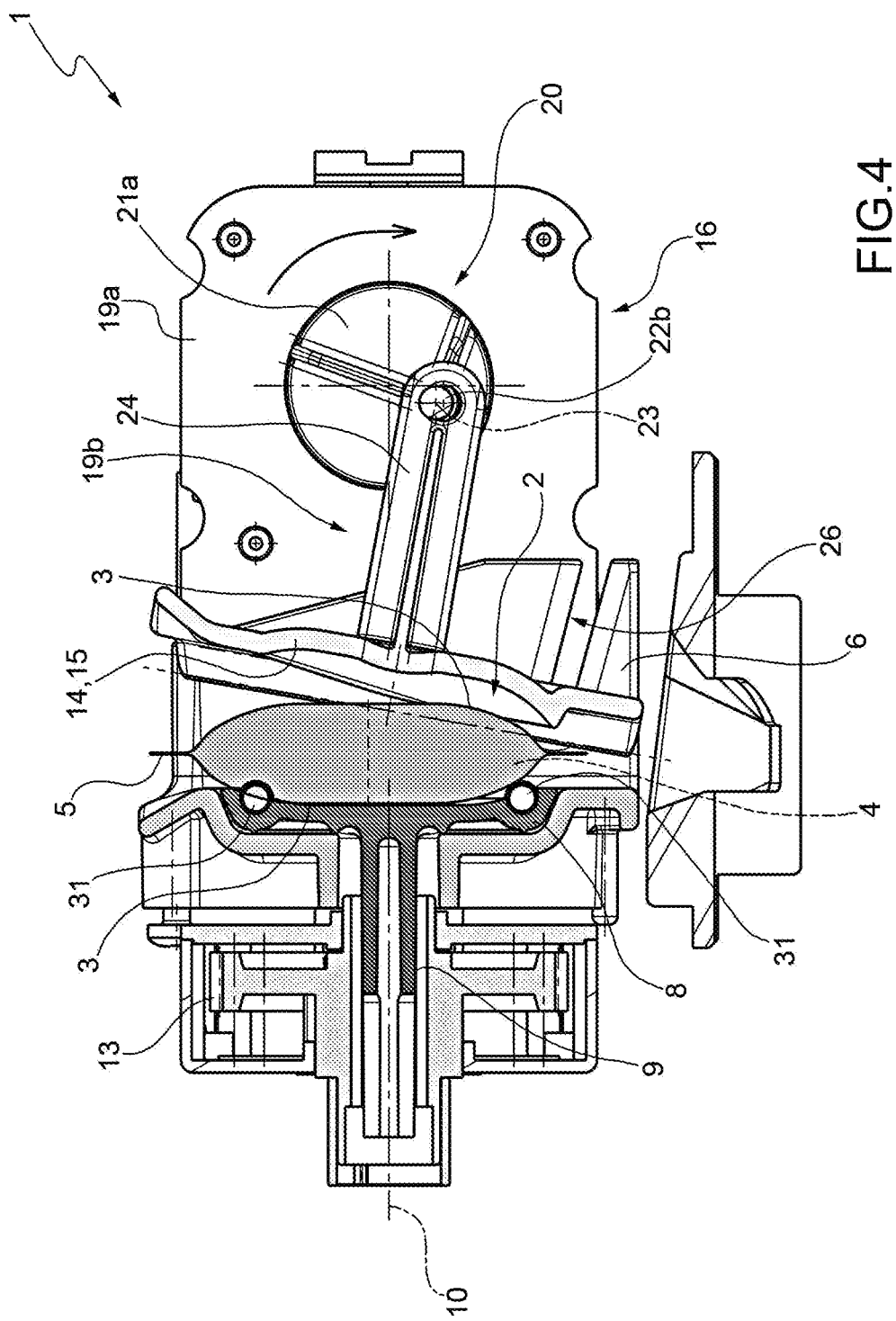
FIGS. 4-6 are three schematic side views, with parts removed for clarity, of the restoring apparatus in FIG. 1 shown in three different operating positions.

Operation of the apparatus 1 will now be described with reference to FIGS. 4 to 6, starting from an instant when the plate 14 is in its loading position and the members 29 are in their rest position (FIG. 4).

Figure 5:
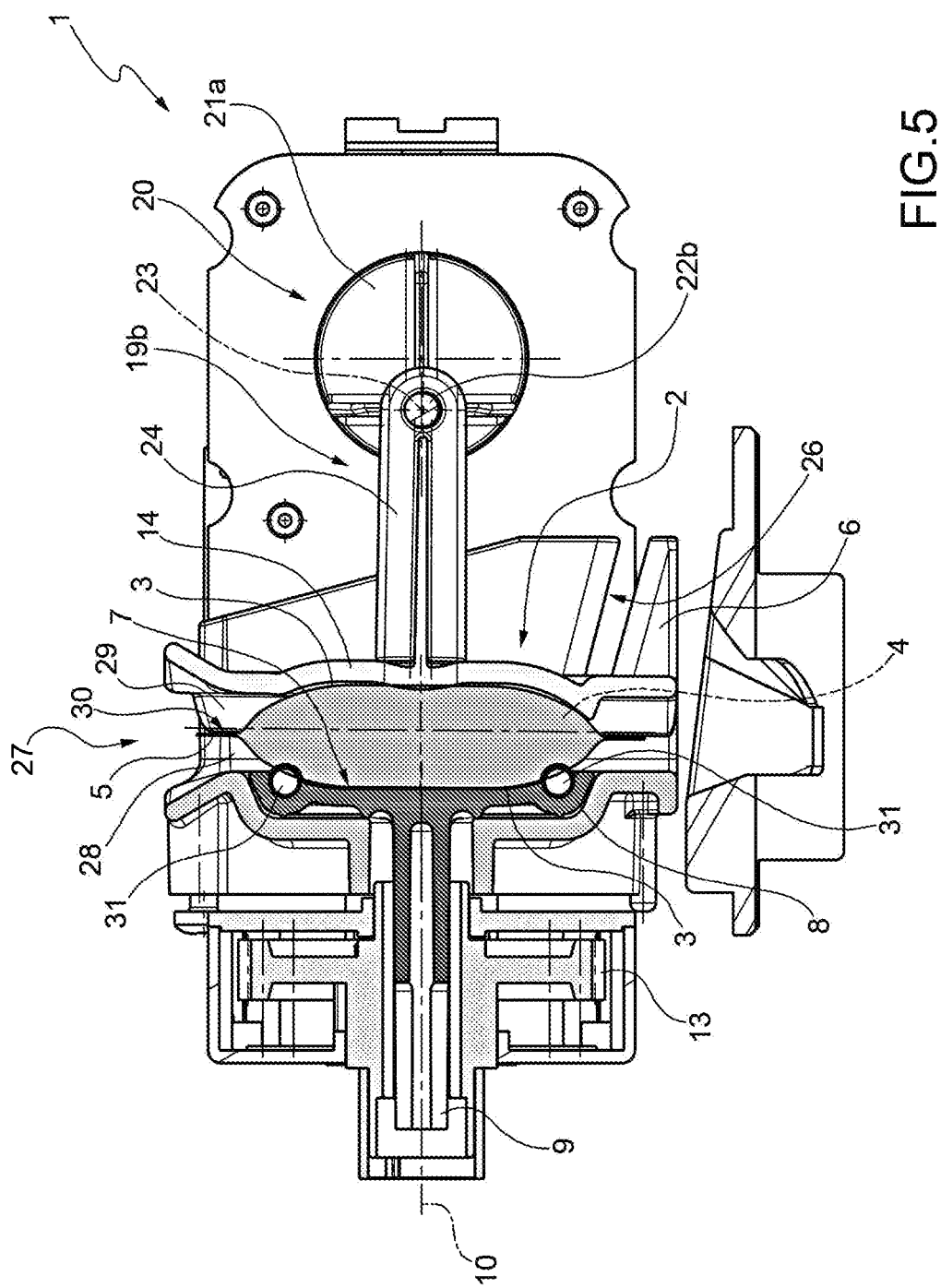
Figure 6:
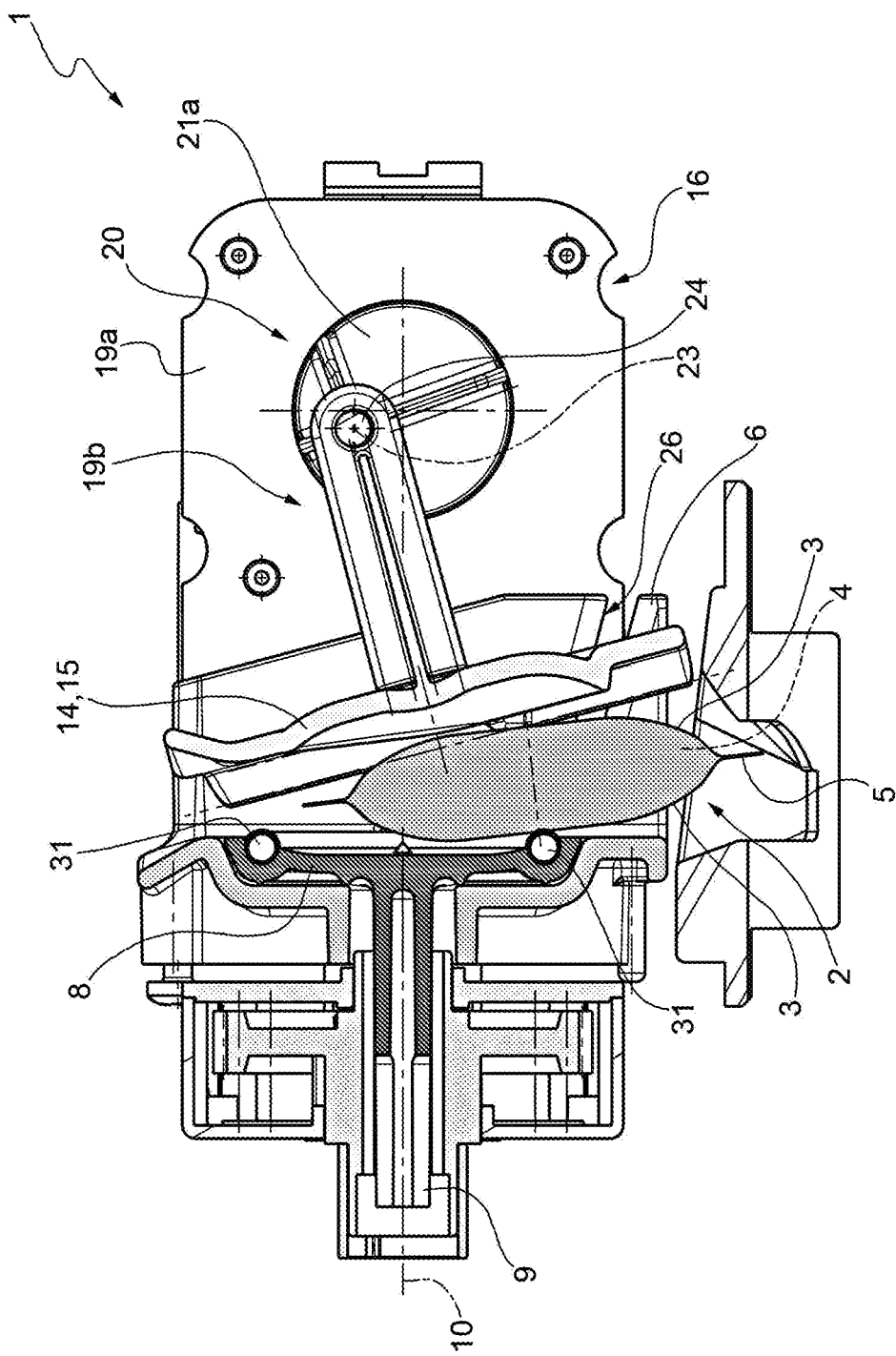
Figure 7:
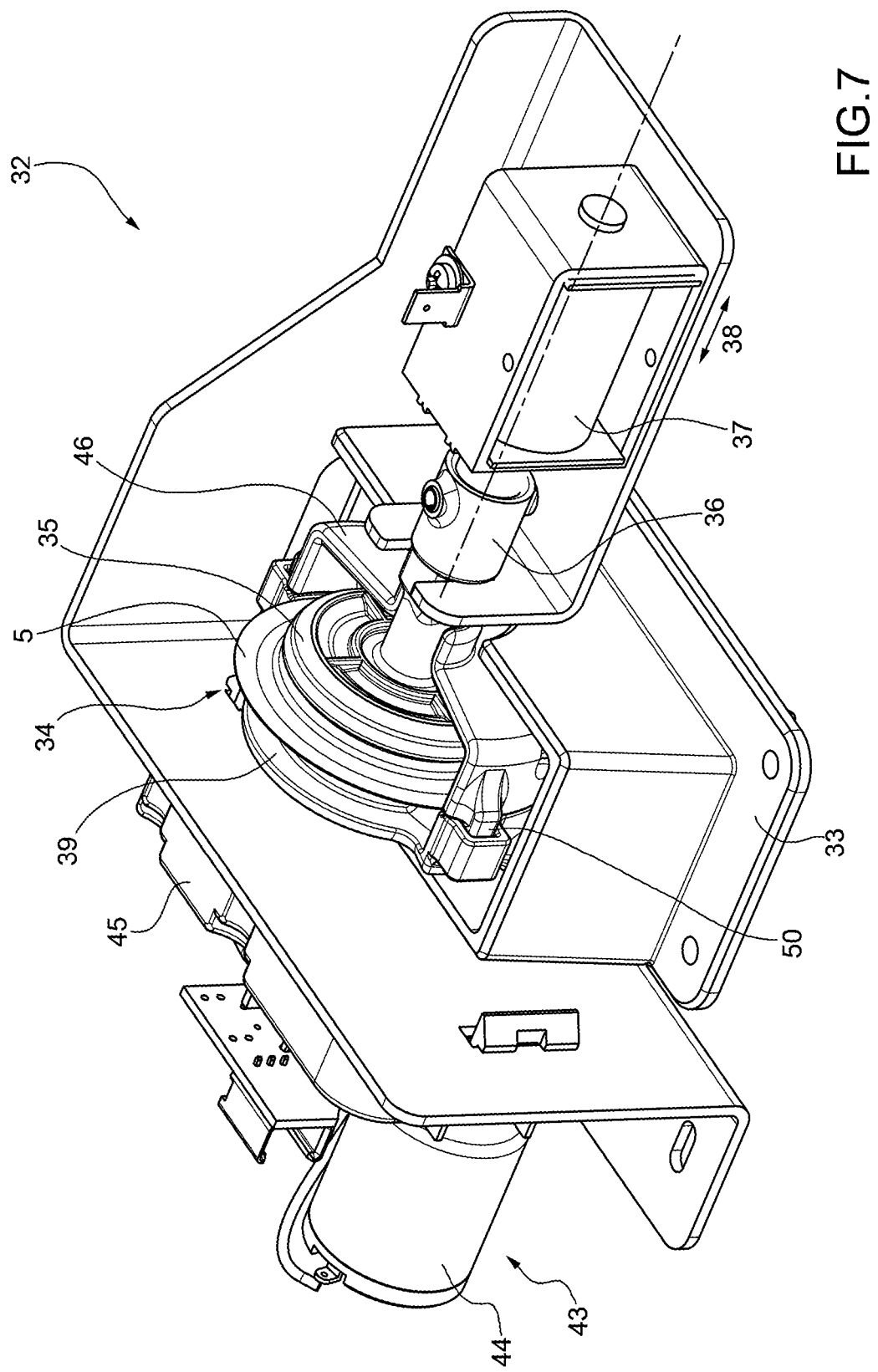
FIG. 7 is a schematic perspective view, with parts removed for clarity, of a second embodiment of the restoring apparatus of the present invention.
Figure 8:
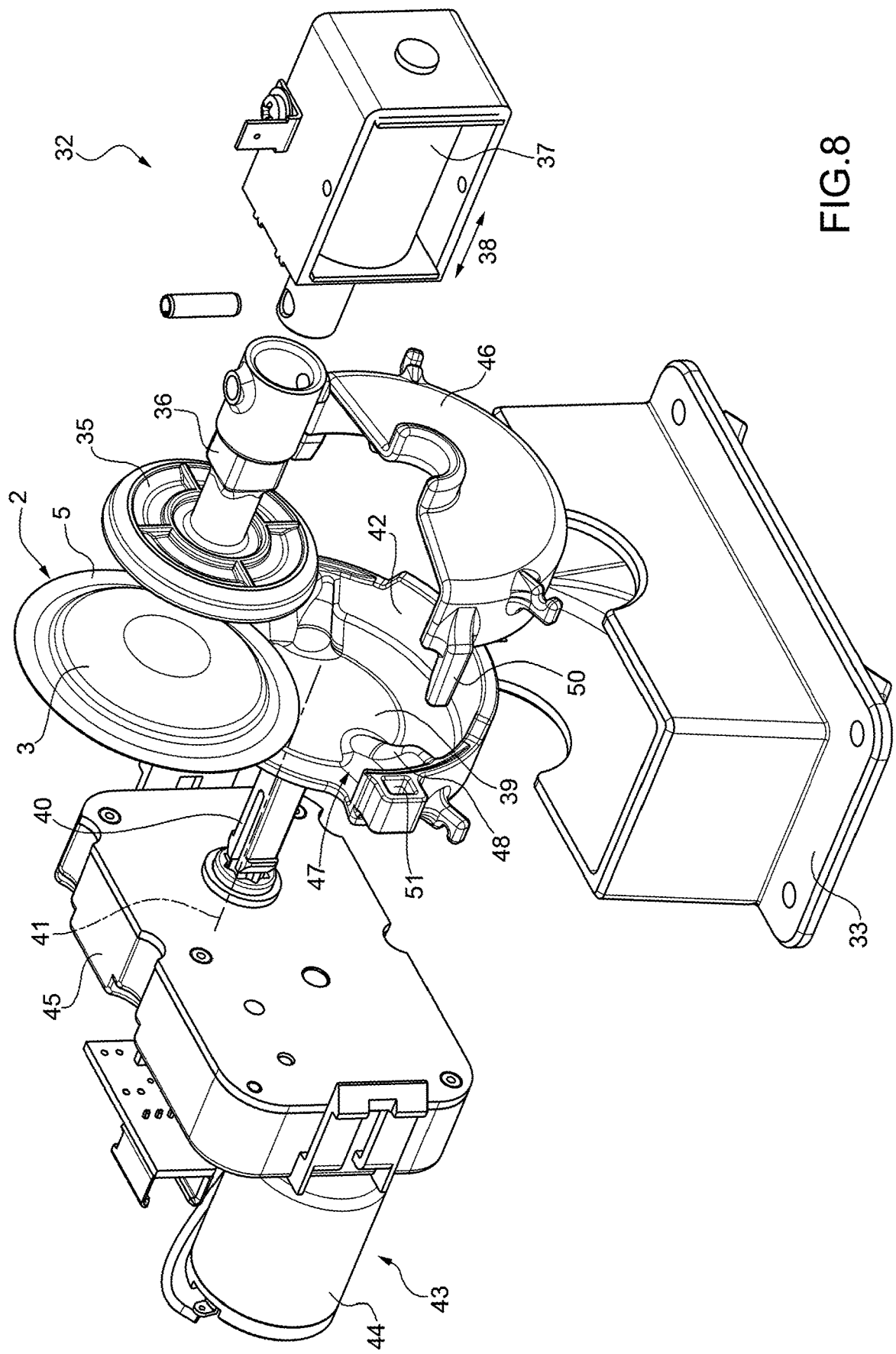
FIGS. 8 and 9 are two exploded, schematic perspective views, with parts removed for clarity, of the restoring apparatus of FIG. 7.
Figure 9:
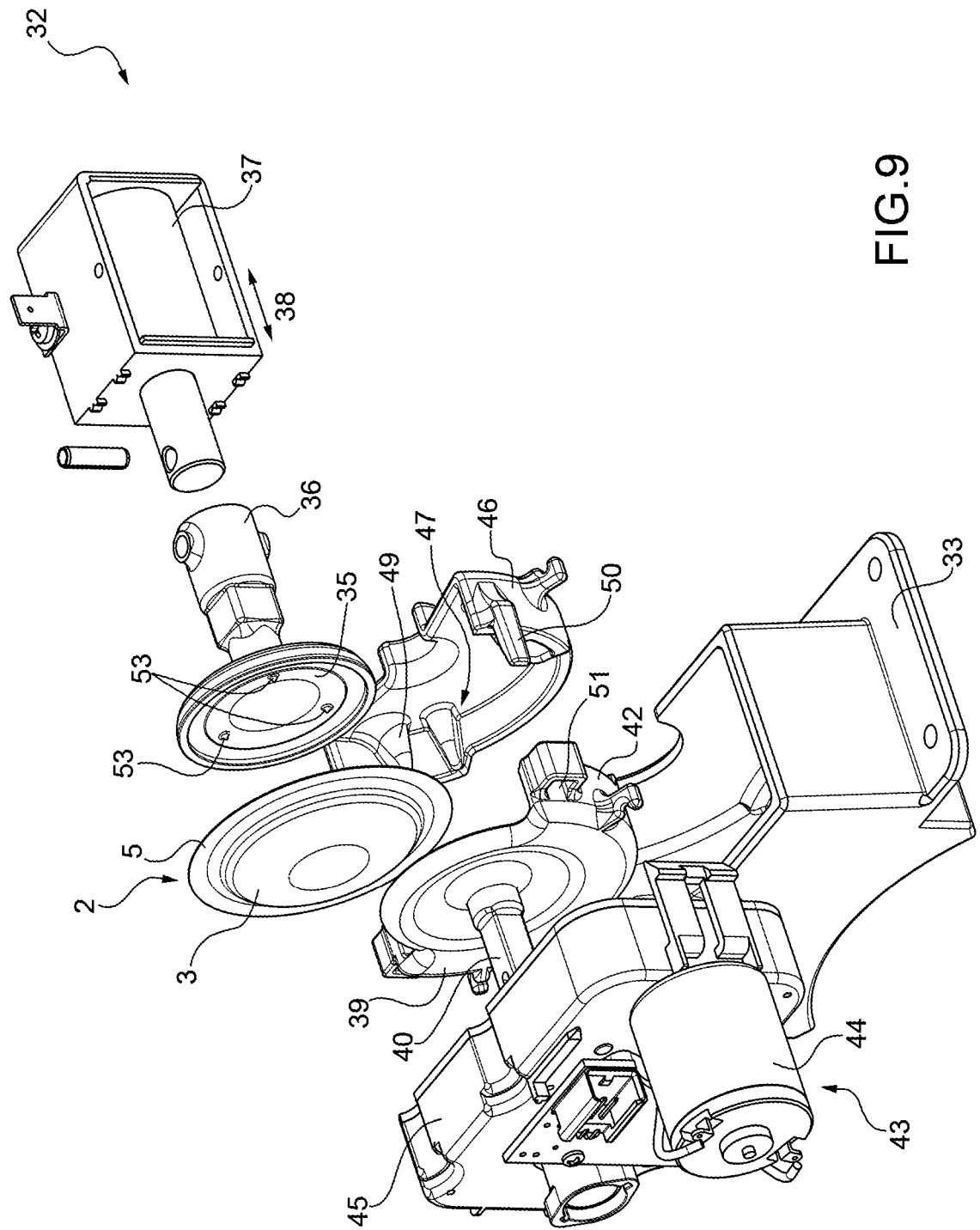

With reference to FIG. 5, once a capsule 2 has been fed, either by gravity or via a feeding device, from the storage unit to the restoring apparatus 1 and is between the plates 8 and 14, the device 16 is operated to move the plate 14 into its clamping position and the members 29 to their operating position in order to engage the flange 5 in the passage 30 and to firmly hold the capsule 2 against the plate 8 via a plurality of support elements 31, which are distributed on the plate 8 around the axis 10, and are made of a material with a high friction coefficient.

In an embodiment not shown, the elements 31 are removed and replaced with piercing elements designed to hold the capsules 2 on the plate 8.

At this point, the device 11 is operated to rotate the assembly defined by the plate 8 and by the capsule 2 about the axis 10 so as to cause the flange 5 to move along the passage 30 and, resultingly, restoring the flange 5 to its original, essentially flat shape or a shape at least approximates its original, essentially flat shape.

Finally, the device 16 is again operated to move the plate 14 to its unloading position and the members 29 to their rest position to enable the capsule 2 to be released from the seat 7.

FIGS. 7 to 12 show a different embodiment of an apparatus 32 for restoring a deformed portion of a beverage preparation capsule 2, wherein the apparatus 32 comprises a shaped frame 33 and a seat 34 configured to accommodate the capsules 2.

The seat 34 comprises a first enclosure portion or plate 35, which has a concave cup shape generally complementary to the shape of half of the chamber 4 of the capsule 2, is fixed to a free end of an output rod 36 of an electromagnetic actuator 37 mounted on the frame 33, and is moved by the actuator 37 in an substantially horizontal direction 38.

The seat 34 also comprises a second enclosure portion or plate 39, which is fixed to a free end of a transmission shaft 40 mounted through the frame 33 to rotate about a rotation axis 41 parallel to the direction 38, and is bounded by a side wall 42 that is substantially semi-cylindrical and coaxial to the axis 41.

The plate 39 is rotated about the axis 41 by a drive device 43 comprising an electric motor 44 fixed to the frame 33 and a gear transmission 45 (FIGS. 10-12) between an output shaft (not shown) of the motor 44 and the shaft 40.

The apparatus 32 also comprises a rotating cradle 46, which has an essentially semi-cylindrical shape and extends around the axis 41.

The cradle 46 is rotatably coupled to the rod 36 to rotate, with respect to the rod 36, about the axis 41, and is also coupled, in an axially fixed manner, to the rod 36 to move in the direction 38 under the thrust of the actuator 37.

The apparatus 32 further comprises a bending device 47 comprising a pair of bending members 48 formed in the plate 39 and a pair of bending members 49 formed in the cradle 46. In a different embodiment, more than two bending members 48 in the plate 39 and correspondent bending members 49 in the cradle 46 may be provided.

When the actuator 37 is electrically de-energized, the assembly defined by the plate 35 and by the cradle 46 is in a clamping position (FIG. 11), in which:
 the plates 35 and 39 block the capsule 2 inside the seat 34;
 the cradle 46 is firmly angularly coupled to the plate 39 by the engagement of a plurality of teeth 50 (in this case, two teeth 50) protruding axially from the cradle 46 in respective slots 51 formed in the plate 39; and
 the members 48 and 49 cooperate to define a bending passage 52 slidably engageable by the flange 5.

When the actuator 37 is electrically powered, the assembly defined by the plate 35 and by the cradle 46 is placed in a release position (FIGS. 10 and 12), in which:
 the plates 35 and 39 release the capsule 2 from the seat 34;
 the teeth 50 disengage from the respective slots 51; and
 the flange 5 disengages from the members 48 and 49.

When the assembly defined by the plate 35 and by the cradle 46 is arranged in its clamping position, the assembly defined by the plate 39 and by the cradle 46 is rotated by the device 43 about the axis 41 between a loading position (FIG. 10), in which the capsule 2 is loaded into the seat 34, and an unloading position (FIG. 12), in which the capsule 2 is unloaded from the seat 34.

With regard to the above, it should be noted that, when the assembly defined by the plate 35 and by the cradle 46 is in its clamping position, the chamber 4 is arranged inside the seat 34 and the flange 5 protrudes outside the seat 34 itself.

Figure 10:
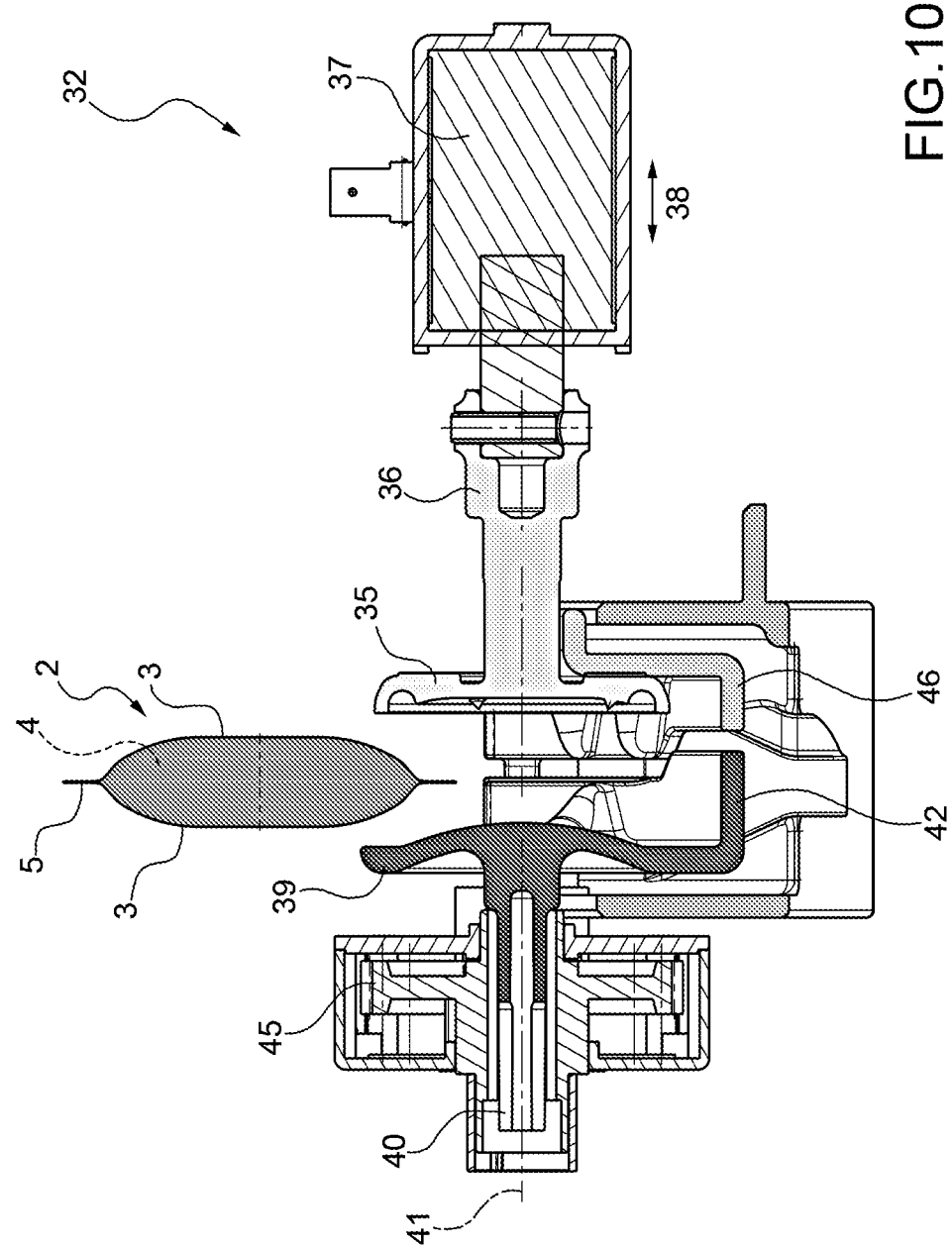
FIGS. 10-12 are three schematic side views, with parts removed for clarity, of the restoring apparatus in FIG. 7 shown in three different operating positions.

Operation of the apparatus 32 will now be described with reference to FIGS. 10 to 12 and starting from an instant in which the assembly defined by the plate 35 and by the cradle 46 is in its release position and the assembly defined by the plate 39 and by the cradle 46 is in its loading position (FIG. 10).

Figure 11:
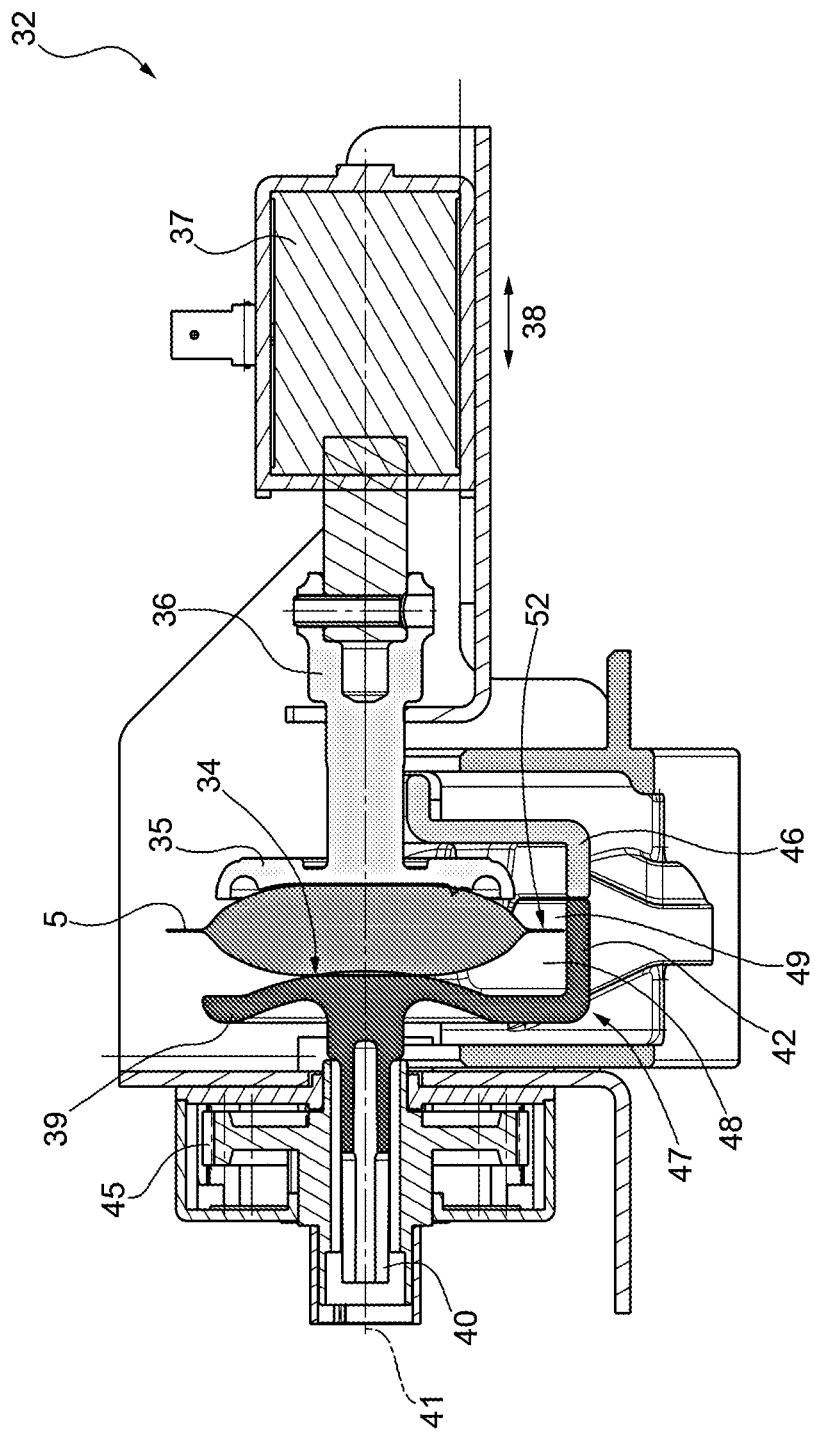

With reference to FIG. 11, once the capsule 2 is inserted between the plates 35 and 39, the actuator 37 is de-energized so as to move the assembly defined by the plate 35 and by the cradle 46 into its clamping position, engage the flange 5 in the passage 52, and hold the capsule 2 against the plate 35 via a plurality of support elements 53, which are distributed on the plate 35 around the axis 41, and are made of a material with a high friction coefficient.

In an embodiment not shown, the elements 53 are removed and replaced with piercing elements designed to hold the capsules 2 against the plate 35.

At this point, the device 43 is operated to rotate the assembly defined by the plate 39 and by the cradle 46 about the axis 41 causing the flange to move along the passage 52 so as to restore to the flange 5 its original, essentially flat shape or a shape at least approximating its original, essentially flat shape.

Figure 12:
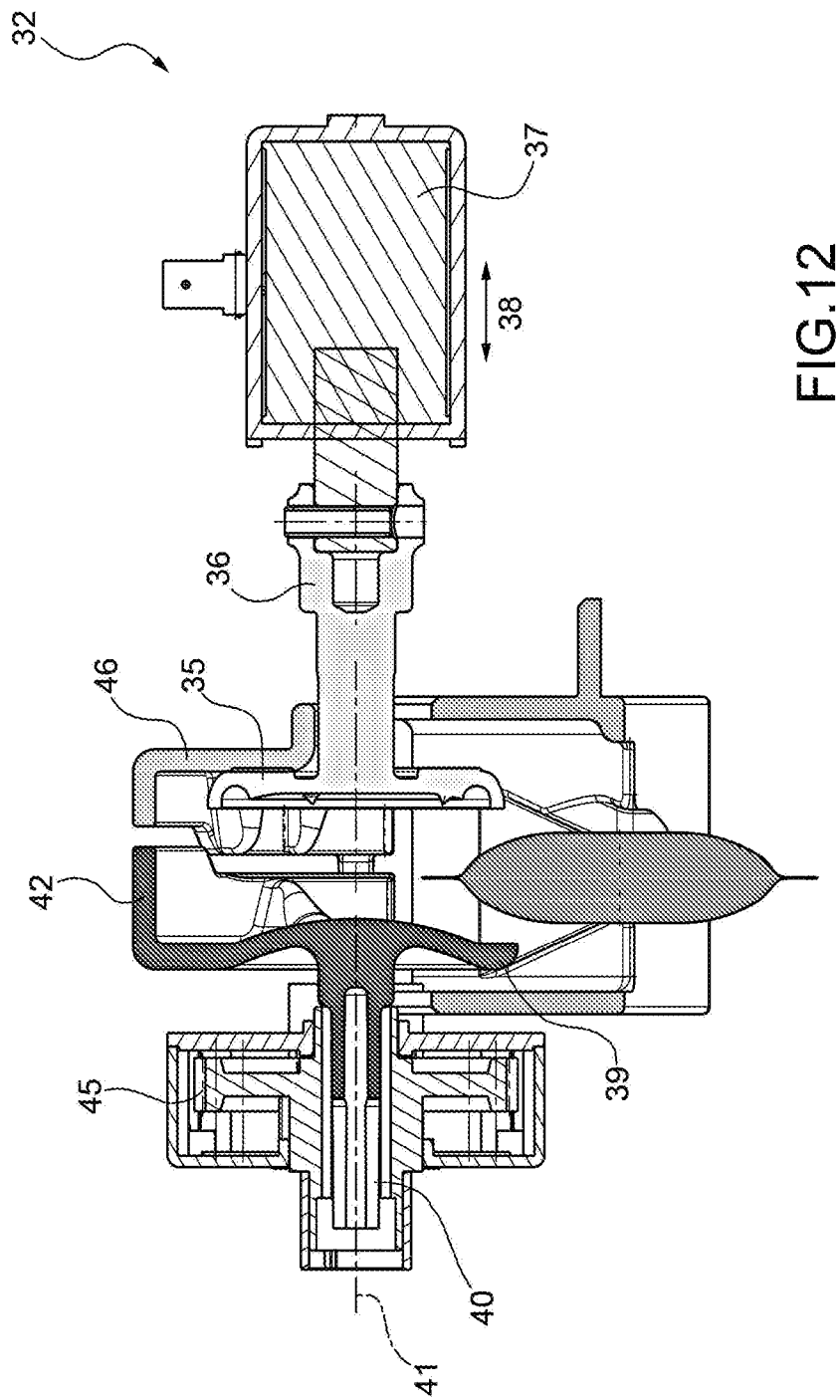

Finally, the assembly defined by the plate 39 and by the cradle 46 is moved to its unloading position to allow the capsule 2 to disengage from the seat 34 (FIG. 12).

The apparatus 1 has the advantage to guarantee that the flange 5 of a capsule 2 fed to the brewing assembly (not shown) has a shape that at least approximates an original shape so as to ensure the correct fluid-tight coupling of the brewing chamber (not shown) with the capsule 2 and the correct feeding of pressurised hot water through the brewing chamber (not shown) and the capsule 2.

The invention claimed is:

1. An apparatus for restoring a deformed portion of a beverage preparation capsule to a shape that approximates an original shape thereof, the apparatus comprising:
   a seat configured to receive the capsule;
   a bending or rectifying device configured to engage the deformed portion of the capsule; and
   a first drive device configured to relatively move the bending or rectifying device and at least part of the seat to cause the bending or rectifying device to restore the deformed portion of the capsule to a shape that at least approximates the original shape as a result of the relative movement of the capsule and the bending or rectifying device.

2. The apparatus of claim 1, wherein the first drive device is connected to the bending or rectifying device and configured to move the bending or rectifying device relative to at least part of the seat.

3. The apparatus of claim 1, wherein the first drive device is connected to at least part of the seat and configured to move at least part of the seat relative to the bending or rectifying device.

4. The apparatus of claim 1, wherein the seat includes two enclosure portions relatively movable between a capsule clamping position in which the capsule is clamped in the seat, and at least a capsule release position in which the capsule is released from the seat.

5. The apparatus of claim 4, further comprising a second drive device configured to relatively move the two enclosure portions between the clamping and release positions.

6. The apparatus of claim 4, wherein a first enclosure portion of the two enclosure portions is connected to the second drive device to move relative to a second enclosure portion of the two enclosure portions between the clamping and release positions.

7. The apparatus of claim 6, wherein the first enclosure portion is configured to hold the capsule, and the bending or rectifying device is connected to the first drive device and configured to move relative to the first enclosure portion and bend the deformed portion of the capsule.

8. The apparatus of claim 7, wherein the second enclosure portion is integrally movable with the bending or rectifying device under the thrust of the first drive device.

9. The apparatus of claim 6, wherein the second enclosure portion is configured to hold the capsule and is connected to the first drive device to move relative to the first enclosure portion and to the bending or rectifying device.

10. The apparatus of claim 1, wherein the capsule includes a central body designed to contain a product for preparing a beverage, and an outer annular flange, which extends around the central body and includes the deformed portion of the capsule; the bending or rectifying device includes a bending passage slidably engageable by the annular flange.

11. The apparatus of claim 10, wherein the bending passage is bounded by two side walls relatively movable between an operating position in which the two side walls bend the annular flange of the capsule, and a rest position in which the two side walls fail to bend the annular flange of the capsule.

\* \* \* \* \*